UNITED STATES PATENT OFFICE.

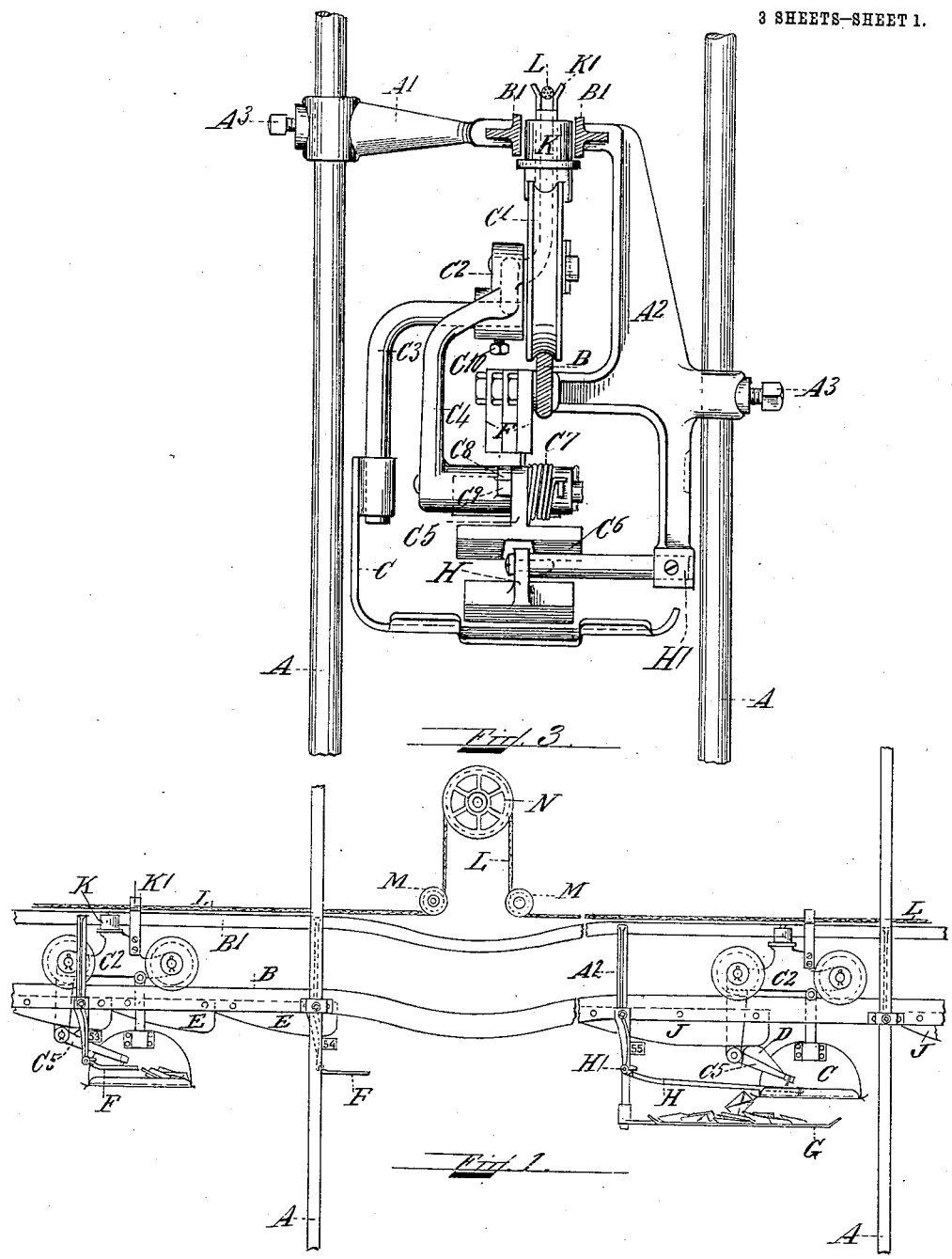

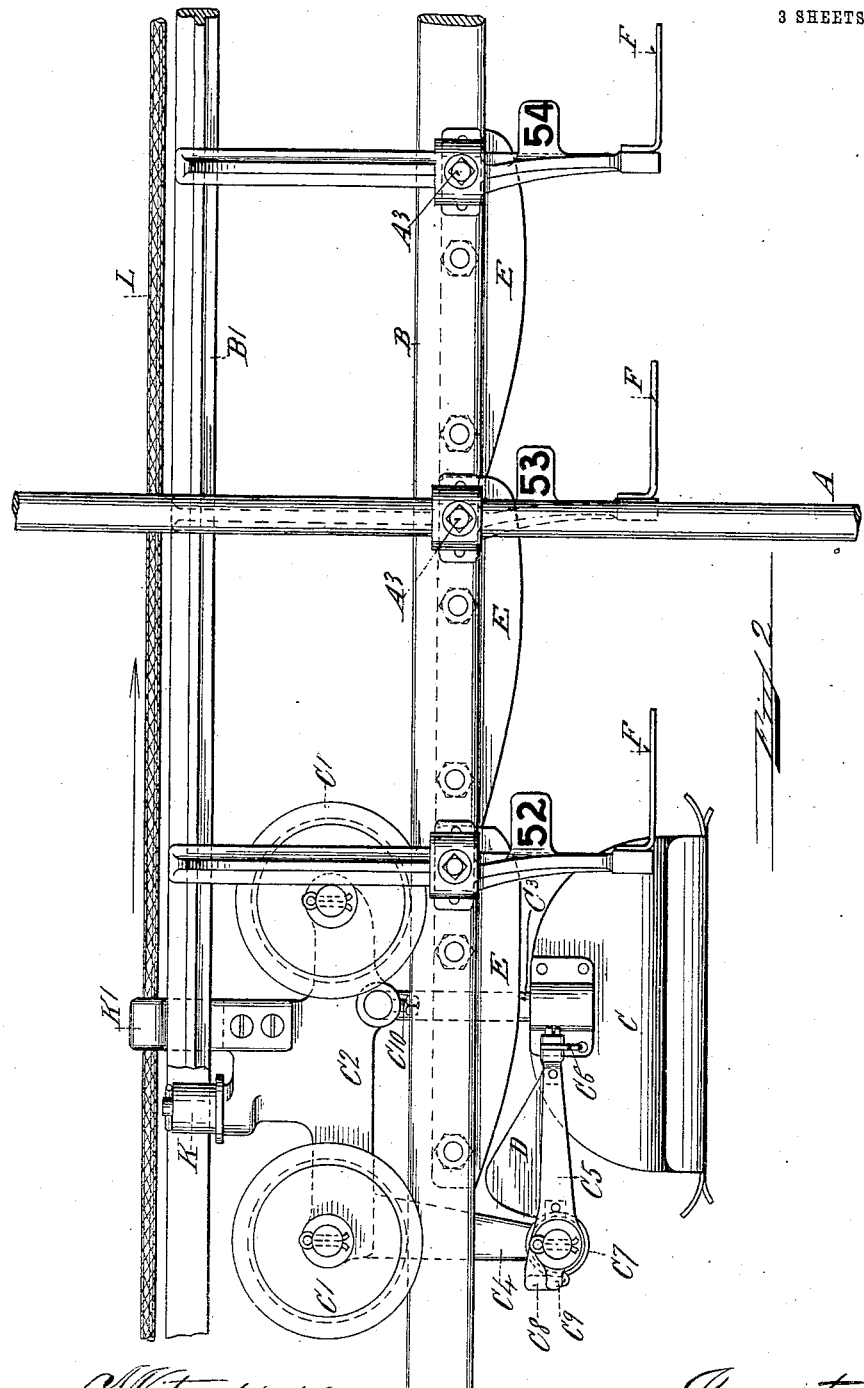

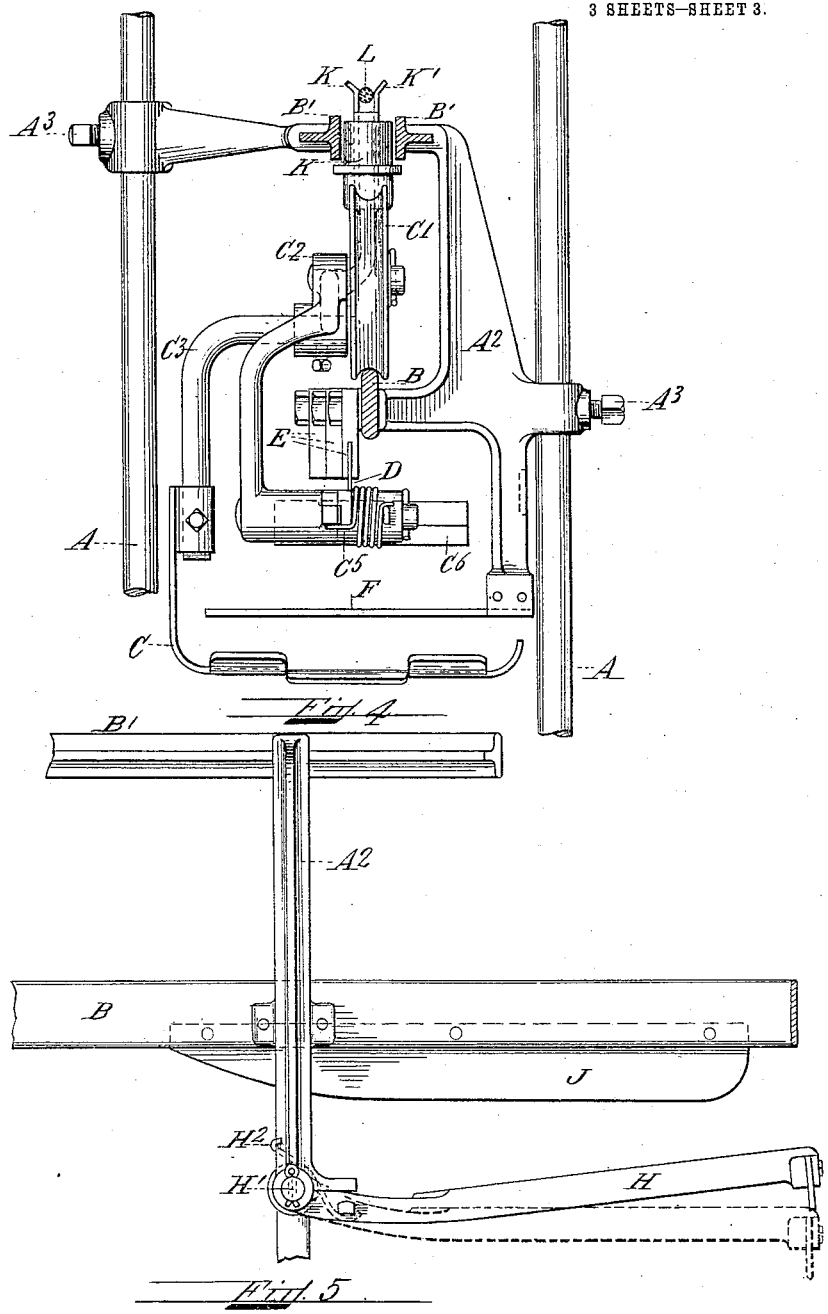

JAMES T. COWLEY, OF BOSTON, MASSACHUSETTS, ASSIGNOR TO LAMSON CONSOLIDATED STORE SERVICE COMPANY, OF NEWARK, NEW JERSEY, A CORPORATION OF NEW JERSEY.

CABLE-CARRIER APPARATUS.

977,070. Specification of Letters Patent. Patented Nov. 29, 1910.

Application filed August 2, 1907, Serial No. 386,697. Renewed September 2, 1910. Serial No. 580,181.

*To all whom it may concern:*

Be it known that I, JAMES T. COWLEY, of Boston, in the county of Suffolk and State of Massachusetts, have invented certain new and useful Improvements in Cable-Carrier Apparatus, of which the following is a specification.

My invention relates to improvements in cable carrier apparatus and particularly to that class of conveyers so combined, constructed and operated as to utilize a car or carrier traveling thereon to automatically pick up and convey letters packages or loose matter from any of a series of despatching stations or shelves located along the system and deliver the same into any of a series of receiving stations.

In the accompanying drawings which illustrate a construction embodying my invention, Figure 1 is a side elevation of a part of the apparatus showing driving mechanism and operations of the carrier in automatically picking up and delivering loads. Fig. 2 is an enlarged elevation showing normal position of a carrier and a series of despatching stations. Fig. 3 is a vertical sectional view showing the operation of the carrier in discharging a load at the receiving station. Fig. 4 is an end view of Fig. 2 looking in the direction of arrow. Fig. 5 is a detail view, the dotted lines showing the operating and the full lines the non-operating position of the automatic unloading mechanism located at the receiving stations.

Like letters of reference refer to like parts throughout the several views.

The vertical standards or supports A carry the adjustable brackets $A'$ and $A^2$ which are secured in position by set screws $A^3$. The supporting track B is secured to brackets $A^2$ and located above said track and secured to the brackets $A'$ and $A^2$ are the guide rails $B'$. The endless cable L is mounted over the grooved pulleys M and also the driving pulley N which may be driven by any suitable power. The grooved wheels $C'$ are journaled in the truck $C^2$ and are adapted to travel on the track B. The carrier C is suspended from the truck $C^2$ by a rod $C^3$ and secured to said truck by the set screws $C^{10}$. Mounted on top of the truck $C^2$ is the roll K which travels between the guide rails $B'$ and prevents swinging or lateral movement of the carrier C. The spring clamp $K'$ secured to the truck $C^2$ engages with the cable L. Mounted directly over said carrier C and pivoted to an extension $C^4$ (Fig. 2) of the truck $C^2$ is an arm $C^5$ carrying a flexible sweep $C^6$ on the outer end thereof. A spring $C^7$ normally holds said arm $C^5$ in the position shown in Figs. 2 and 3 with stops $C^8$ and $C^9$ in engagement. Mounted on top of the arm $C^5$ is a cam D which is adapted to engage with one of a number of stationary selective cams E secured to brackets $A^2$. One of these cams E is located at each despatching station and is adapted to engage with the cam D on a designated carrier to depress the arm $C^5$ and sweep $C^6$ to sweep a shelf F located at its respective station to cause the articles located on said shelf to fall into the carrier C (Fig. 1).

The shelves F are secured to brackets A and located between the path of travel of the carrier C and the sweep $C^6$ to prevent obstructing the passage of loaded carriers. Located at each receiving station is a shelf G secured to a bracket $A^2$ and also pivoted at $H'$ to said bracket $A^2$ is a stationary sweep H normally held in the position shown in full lines Fig. 5 by spring $H^2$. There is also mounted at each receiving station a stationary selective cam J which is adapted to engage with cam D on a designated carrier to depress the arm $C^5$, which in turn engages and depresses the sweep H which sweeps the carrier C causing the articles thereon to drop from the carrier onto the receiving shelf G as shown in Figs. 1 and 3. Thus it will be seen that each carrier is adapted to selectively pick up a load at a designated despatching station and to discharge said load at a certain receiving station.

Having thus described the nature of my invention and set forth a construction embodying the same, what I claim as new and desire to secure by Letters Patent of the United States is:

1. In an apparatus of the character described, a track or way, carriers adapted to travel on said track or way, means for driving said carriers, despatching stations or shelves located along the path of travel of said carrier, mechanism located on said carrier adapted to be selectively operated to sweep articles from said shelves into said carriers, and selective means adapted to operate said mechanism on a designated carrier to remove articles from a designated despatching station into said carrier.

2. In an apparatus of the character described, a track or way, carriers adapted to travel on said track or way, means for driving said carriers, receiving stations located along the path of travel of said carriers, mechanism located at said receiving stations and adapted to be selectively operated by mechanism on said carriers to sweep articles from said carriers into said stations, and selective means adapted to operate said mechanism at a designated station to remove the articles from a designated carrier into said station.

3. In an apparatus of the character described, a track or way, carriers adapted to travel on said track or way, means for driving said carriers, despatching stations or shelves located along the path of travel of said carrier, mechanism located on said carrier adapted to be selectively operated to remove articles from said shelves into said carriers, selective means adapted to operate said mechanism on a designated carrier to remove articles from a designated despatch station into said carrier, receiving stations or shelves located along the path of travel of said carrier, movable mechanism located at each receiving station to remove articles from the carrier into said receiving station, and selective means located in each receiving station for operating the mechanism on a designated carrier to operate the removing mechanism at said receiving station.

In testimony whereof, I have signed my name to this specification in the presence of two subscribing witnesses.

JAMES T. COWLEY.

Witnesses:
DELIA S. PETERSON,
M. L. EMERSON.